US008248936B2

(12) United States Patent
Kantawala et al.

(10) Patent No.: US 8,248,936 B2
(45) Date of Patent: Aug. 21, 2012

(54) TUNING CONGESTION CONTROL IN IP MULTICAST TO MITIGATE THE IMPACT OF BLOCKAGE

(75) Inventors: Anshul Kantawala, Frederick, MD (US); Dilip S. Gokhale, Gaithersburg, MD (US); Stephen F. Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 314 days.

(21) Appl. No.: 12/588,811

(22) Filed: Oct. 28, 2009

(65) Prior Publication Data

US 2010/0254262 A1 Oct. 7, 2010

Related U.S. Application Data

(60) Provisional application No. 61/202,758, filed on Apr. 1, 2009.

(51) Int. Cl.
*H04L 12/26* (2006.01)
*H04J 3/22* (2006.01)

(52) U.S. Cl. .......................... 370/232; 370/252; 370/468

(58) Field of Classification Search .......... 370/229–232, 370/235, 252, 464, 465, 468
See application file for complete search history.

(56) References Cited

U.S. PATENT DOCUMENTS

| 6,680,906 B1 * | 1/2004 | Nguyen ........................ 370/229 |
| 6,910,024 B2 * | 6/2005 | Krishnamurthy et al. .... 705/400 |
| 7,907,519 B2 * | 3/2011 | Songhurst et al. ............ 370/229 |
| 2009/0067335 A1 * | 3/2009 | Pelletier et al. ................ 370/238 |
| 2009/0109847 A1 * | 4/2009 | Stephenson et al. .......... 370/232 |

OTHER PUBLICATIONS

Adamson, B., Bormann, C., Handley, M., Macker, J., Negative-acknowledgment (NACK)-Oriented Reliable Multicast (NORM) Protocol, IETF RFC 3940, Nov. 2004.
Adamson, B., Bormann, C., Handley, M., Macker, J., Negative-Acknowledgment (NACK)-Oriented Reliable Multicast (NORM) Building Blocks, IETF RFC 3941, Nov. 2004.
Ramakrishnan, K., Floyd, S. and D. Black, "The Addition of Explicit Congestion Notification (ECN) to IP", RFC 3168 Sep. 2001.
Widmer J., RFC 4654: "TCP-Friendly Multicast Congestion Control (TFMCC): Protocol Specification" (Aug. 2006).

* cited by examiner

*Primary Examiner* — Kerri Rose
(74) *Attorney, Agent, or Firm* — Oliff & Berridge, PLC

(57) ABSTRACT

An IP multicast broadcast device, an IP multicast receiver device, and a method of congestion control in reliable IP multicast are described that mitigate the impact of signal blockage in radio-based IP multicast networks. In one example multicast network, the IP multicast broadcast device, and the IP multicast receiver devices may be configured to support an IGMP-based multicast protocol in which a NORM protocol, a congested packet marking protocol, e.g., such as the ECN protocol described above, and a router congestion prediction protocol, e.g., such as the RED protocol, have been implemented. In addition, the implemented NORM protocol may implement a TCP congestion control algorithm that generates adjusted transmission rates based, at least in part, on a count of ECN congestion marked packets and a count of dropped packets at a selected receiver. As a result, the generated transmission rates are not unduly affected blockage of the radio-based transmission signal.

20 Claims, 9 Drawing Sheets

TUNING CONGESTION CONTROL IN IP MULTICAST TO MITIGATE THE IMPACT OF BLOCKAGE

INCORPORATION BY REFERENCE

This application claims the benefit of U.S. Provisional Application No. 61/202,758, "TUNING CONGESTION CONTROL IN IP MULTICAST TO MITIGATE THE IMPACT OF BLOCKAGE," filed by Anshul Kantawala, Dilip Shyamsundar Gokhale and Stephen Francis Bush on Apr. 1, 2009, which is incorporated herein by reference in its entirety.

BACKGROUND

Reliable multicast protocols enable efficient data transfers with high probability of success to large numbers of receivers. Such protocols are particularly useful in networks that suffer from network capacity constraints but that have a need to reliably distribute data to a large number of receiving devices.

Protocols that support reliable multicast over Internet Protocol (IP) networks have been standardized by the Internet Engineering Task Force (IETF). However, such protocols were developed for use over wire-based physical networks. Therefore, such protocols have not been optimized to support multicast systems that broadcast IP multicast messages via radio-based transmission systems, e.g., ground-based radio transmission systems and satellite-based transmission systems, and that are subject to intermittent radio signal blockages. As a result, radio channel blockages can have a significant adverse impact on the performance of existing reliable IP multicast protocols.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Radio-based reliable IP multicast transmission systems that suffers from intermittent, short term radio signal blockages of transmissions to one or more multicast receiver devices rarely experiences significant multicast broadcast device transmission queue congestion as a result of such intermittent blockages. Instead, the blockages are usually quickly cleared and only a relatively small number of packets require retransmission. The retransmission of a relatively small numbers of packets may temporarily increase a number of packets stored in a corresponding multicast broadcast device transmission queue, but is unlikely to result in significant transmission queue congestion.

However, such intermittent, short term radio signal blockages can significantly increase the estimated round trip time determined for a monitored congestion control monitoring period and, therefore, can significantly reduce the transmission rate subsequently assigned to the channel based on TCP congestion control algorithms used in existing reliable multicast protocols, such as the NACK Oriented Reliable Multicast (NORM) protocol. Throttling back a transmission channel's transmission rate in response to low levels of blockage does nothing to clear, or prevent, the intermittent blockages. However, lowering the transmission rate under such conditions can unnecessarily decrease system throughput and can exacerbate system congestion.

Therefore, exemplary embodiments of an IP multicast broadcast device, an IP multicast receiver device, and a method of congestion control in reliable IP multicast are described that mitigate the impact of signal blockage in radio-based reliable IP multicast networks. In one example multicast network, the IP multicast broadcast device, and the IP multicast receiver devices may be configured to support an Internet Group Management Protocol (IGMP) based multicast protocol in which a NORM protocol, a congested packet marking protocol, e.g., such as the ECN protocol described above, and a router congestion prediction protocol, e.g., such as the RED protocol, have been implemented. In addition, the implemented NORM protocol may implement a TCP congestion control algorithm that generates adjusted transmission rates based, at least in part, on a count of ECN congestion marked packets and a count of dropped packets at a selected receiver. As a result, the generated transmission rates are not unduly affected, i.e., unduly reduced, by intermittent blockage of the radio-based transmission signal.

Exemplary embodiments maintain high channel transmission rates under light blockage conditions, unlikely to result in significant transmission queue congestion in the reliable IP multicast broadcast device, yet appropriately reduce channel transmission rates under heavy signal blockage conditions that would likely result in measurable congestion in the reliable IP multicast broadcast device. Exemplary embodiments achieve such results by adjusting the transmission loss, e.g., a loss event fraction, used in existing TCP congestion control algorithms to reflect both a count of congestion marked packets and a count of dropped packet transmissions detected during a congestion control monitoring period.

In one exemplary embodiment, a multicast broadcast device is described that includes, a radio transceiver that transmits multicast packets to a plurality of receiver devices, a transmission queue that stores the multicast packets in preparation for transmission by the radio transceiver, a queue monitoring module that monitors the transmission queue and marks the packets in the queue to indicate a state of congestion on determining that one or more queue characteristics exceed a first predetermined queue parameter, and a status response processing module that processes a status response message from one of the plurality of receiver devices to retrieve one or more parameters used to determine a transmission rate for the packets in the transmission queue, in which the transmission rate is determined in part on a count of marked packets received by the one of the plurality of receiver devices and a count of packet transmissions dropped by the one of the plurality of receiver devices.

In a second exemplary embodiment, a multicast receiver device is described that includes, a radio transceiver that receives packets from a multicast broadcast device, a marked packet count module that generates a count of marked packets received by the receiver device that are marked to indicate congestion, a dropped packet count module that generates a count of packet transmissions dropped by the receiver device, and a status response message module that generates and sends to the multicast broadcast device a status response message containing a loss event parameter based on at least one of the generated count of marked packets and the generated count of dropped packets.

In a third exemplary embodiment, a method of performing IP multicast congestion control is described that includes, storing received multicast packets in a transmission queue prior to transmission to a plurality of receiver devices, monitoring the transmission queue to determine whether one or more queue characteristics exceed a first predetermined queue parameter, marking the packets in the queue to indicate a state of congestion on determining that the first predetermined queue parameter has been exceeded, and processing a status response message from one of the plurality of receiver devices to retrieve one or more parameters used to determine a transmission rate for the packets in the transmission queue, in which the transmission rate is determined in part on a count of marked packets received by the one of the plurality of receiver devices and a count of packet transmissions dropped by the one of the plurality of receiver devices.

BRIEF DESCRIPTION OF THE DRAWINGS

Exemplary embodiments of an IP multicast broadcast device, exemplary embodiments of an IP multicast receiver device, and exemplary embodiments of a method of congestion control in IP multicast networks that mitigates the impact of signal blockage are described with reference to the following drawings, wherein like numerals designate like elements, and wherein.

DETAILED DESCRIPTION OF EMBODIMENTS

Figure 1:
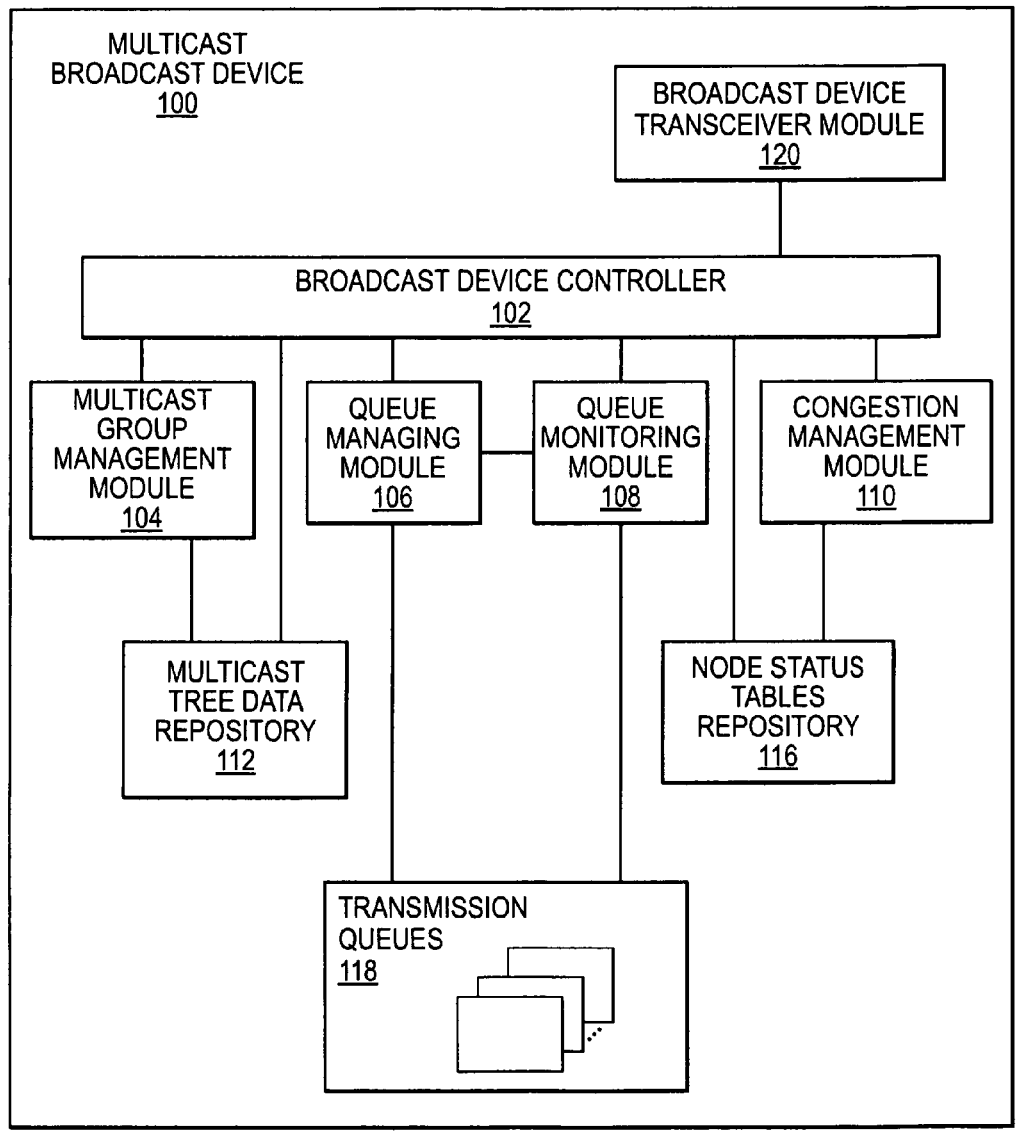
FIG. 1 is a block diagram of an exemplary embodiment of an IP multicast broadcast device that includes features that support exemplary embodiments of the described method of congestion control in IP multicast that mitigates the impact of signal blockage.

FIG. 1 is a block diagram of an exemplary embodiment of an IP multicast broadcast device that includes features that support exemplary embodiments of the described method of congestion control in radio-based IP multicast networks that mitigates the impact of radio signal blockage. As shown in FIG. 1, multicast broadcast device 100 can include a broadcast device controller 102, a multicast group management module 104, a queue managing module 106, a queue monitoring module 108, a congestion management module 110, a multicast tree data repository 112, a node status tables repository 116, transmission queues 118, and a broadcast device transceiver module 120.

In operation, broadcast device controller 102 maintains a set of static and/or dynamically updated control parameters that can be used by broadcast device controller 102 to invoke the other modules included in multicast broadcast device 100 to perform operations, as described below, in accordance with the control parameters and a set of predetermined process flows, such as the process flows described below with respect to FIG. 5 and FIG. 7. Broadcast device controller 102 may communicate with and receive status updates from the respective modules within multicast broadcast device 100 to allow broadcast device controller 102 to control operation of the respective process flows. For example, with respect to broadcast content packets received from a broadcast source device, e.g., via broadcast device transceiver module 120, broadcast device controller 102 can control the processing, queuing, and multicast transmission of the received broadcast content packets, e.g., via broadcast device transceiver module 120, to a plurality of receiver devices. Further, as described in greater detail below, broadcast device controller 102 can coordinate with the respective receiver devices to a method of congestion control, described below, that mitigates the impact of radio signal blockage on IP multicast network transmission rates.

Multicast group management module 104 is responsible for implementing a selected Internet Group Management Protocol (IGMP) and assuring that an IGMP multicast tree is formed with multicast broadcast device 100 as the root. Multicast group management module 104 may store, in multicast tree data repository 112, multicast tree data associated with multicast connections established between multicast broadcast device 100 and a plurality of receiver devices, such as the example receiver embodiment described below with respect to FIG. 3.

Queue managing module 106 receives incoming broadcast content packets, either directly from broadcast device transceiver module 120 or via broadcast device controller 102, extracts routing data from the IP header of each respective packet and assigns each packet to one or more transmission queues 118 based on the IP header routing information and queue routing definitions stored in multicast tree data repository 112 for the respective transmission queues. Further, queue managing module 106 is responsible for providing to broadcast device transceiver module 120, either directly or via broadcast device controller 102, with streams of packets retrieved from the respective transmission queues 118 in support of multicast transmissions from multicast broadcast device 100 to the respective receiver devices associated with the respective queues base on queue routing definitions stored in multicast tree data repository 112.

Queue monitoring module 108 monitors transmission queues 118 for signs that an individual queue within transmission queues 118 is congested. Once a congested queue is identified, the queue monitoring module 108 marks packets within the congested queue to indicate a state of congestion, or instructs queue managing module to mark packets from the congested queue to indicate a state of congestion as packets are pulled from the queue for transmission via broadcast device transceiver module 120. In this manner, a receiver device counts a number of congestion marked packets received during a period of time, for use in congestion management, as described greater detail below.

For example, in one exemplary embodiment, queue monitoring module 108 implements protocols, such as the explicit congestion notification (ECN) protocol and the random early discard (RED) protocol. The ECN protocol, provides an ECN field in the header of each packet that may be set to indicate whether the queue from which the packet came is suffering from congestion. The RED protocol allows a congested queue to be identified based on an exponentially weighted moving average of the queue length, i.e., the number of packets stored within the queue, and determines that a queue is congested or determining that the exponentially weighted moving average of the queue length exceeds a first predetermined threshold, $min_{th}$.

In one exemplary embodiment, upon detecting that a queue is suffering from congestion, e.g., based on the RED protocol, queue monitoring module 108 modifies the packet header of each packet in the queue to indicate congestion, e.g., by updating the ECN field according to the ECN protocol. In such an embodiment, upon determining that the queue is no longer congested, e.g., again based on the exponentially weighted moving average of the queue length of the RED protocol, the header fields of packets in a queue that have been modified to indicate congestion are updated to clear the ECN field upon queue monitoring module 108.

In another exemplary embodiment, upon detecting that a queue is suffering from congestion, e.g., based on the RED protocol, queue monitoring module 108 can instruct queue managing module 106 to mark the header of each packet as it is transmitted from the congested queue, e.g., by updating the ECN field according to the ECN protocol, until queue managing module 106 is notified by queue monitoring module 108 that the queue is no longer congested. Such approach does not require the marked header fields to be cleared, after the queue is determined to no longer be congested. In yet another exemplary embodiment, upon detecting that a queue is suffering from severe congestion, e.g., the exponentially weighted moving average of the queue length exceeds a first predetermined threshold, $max_{th}$, queue monitoring module 108 can instruct queue managing module 106 to randomly delete one or more packets from the transmission queue.

Congestion management module 110 is responsible for monitoring congestion between the multicast broadcast device in which congestion management module 110 is implemented and respective receiver devices that have subscribed to a multicast transmission service supported by the multicast broadcast device. For example, in one exemplary embodiment, congestion management module 110 may perform congestion management using a congestion protocol such as the NORM protocol, that has been adapted to support the ECN protocol and RED protocols, as described above, and as described in greater detail below.

For example, in one exemplary embodiment, congestion management module 110 may periodically generate and transmit to each receiver device that has subscribed to a multicast transmission, a congestion status request message, e.g., a NORM_CMD(CC) message as defined in the NORM protocol, that requests a congestion status response message, e.g., a NORM_ACK(RTT) message as defined in the NORM protocol. In response to a congestion status request message, congestion management module 110 receives a congestion status response message that includes congestion related data. For example, the congestion status response message can include a count of congestion marked packets received by the responding multicast device within a congestion monitoring period, and/or a count of packet transmissions dropped during the same congestion monitoring period, and may include data related to the round trip time (RTT) of the congestion status request message/congestion status response message transmission cycle, as described in greater detail below with respect to FIG. 2.

For example, in another exemplary embodiment, congestion management module 110 may receive a congestion status response message that includes a count of the congestion marked packets received by the responding multicast device within a congestion monitoring period, and a count of packet transmissions dropped during the same congestion monitoring period. In another exemplary embodiment, congestion management module 110 may receive a congestion status response message that includes a congestion parameter generated by the responding receiver device based on a count of the congestion marked packets received by the responding receiver device within a congestion monitoring period, and a count of packet transmissions dropped during the same congestion monitoring period. For example the congestion status response message may include a measure of transmission loss in the form of a fraction, greater than zero and less than 1, that is based on a count of the congestion marked packets received by the responding receiver device within a congestion monitoring period, and a count of packet transmissions dropped during the same congestion monitoring period. Such a measure of the transmission loss could be stored in the CC_LOSS field of the IP packet which is currently used by the NORM protocol to hold a measure of transmission loss based only on a count of the congestion marked packets received by the responding receiver device within a congestion monitoring period, and is not based on a count of packet transmissions dropped during the same congestion monitoring period.

Node status tables repository 116 is used by congestion management module 110 to store congestion information received from the respective receiver nodes in congestion status response messages sent in response to a transmitted congestion status request message. For example, node status tables repository 116 may include a table for each responding receiver device that includes, for example, a count of congestion marked packets received by the responding receiver device within a congestion monitoring period, a count of packet transmissions dropped during the same congestion monitoring period, and the round trip time required for completion of the congestion status request message/congestion status response message cycle for the responding receiver device as described in greater detail below with respect to FIG. 2. The data stored in node status tables repository 116 is used to determine a new transmission rate for a transmission queue that is based on actual network congestion and yet mitigates the impact of signal blockage, as described below with respect to FIG. 2.

Figure 2:
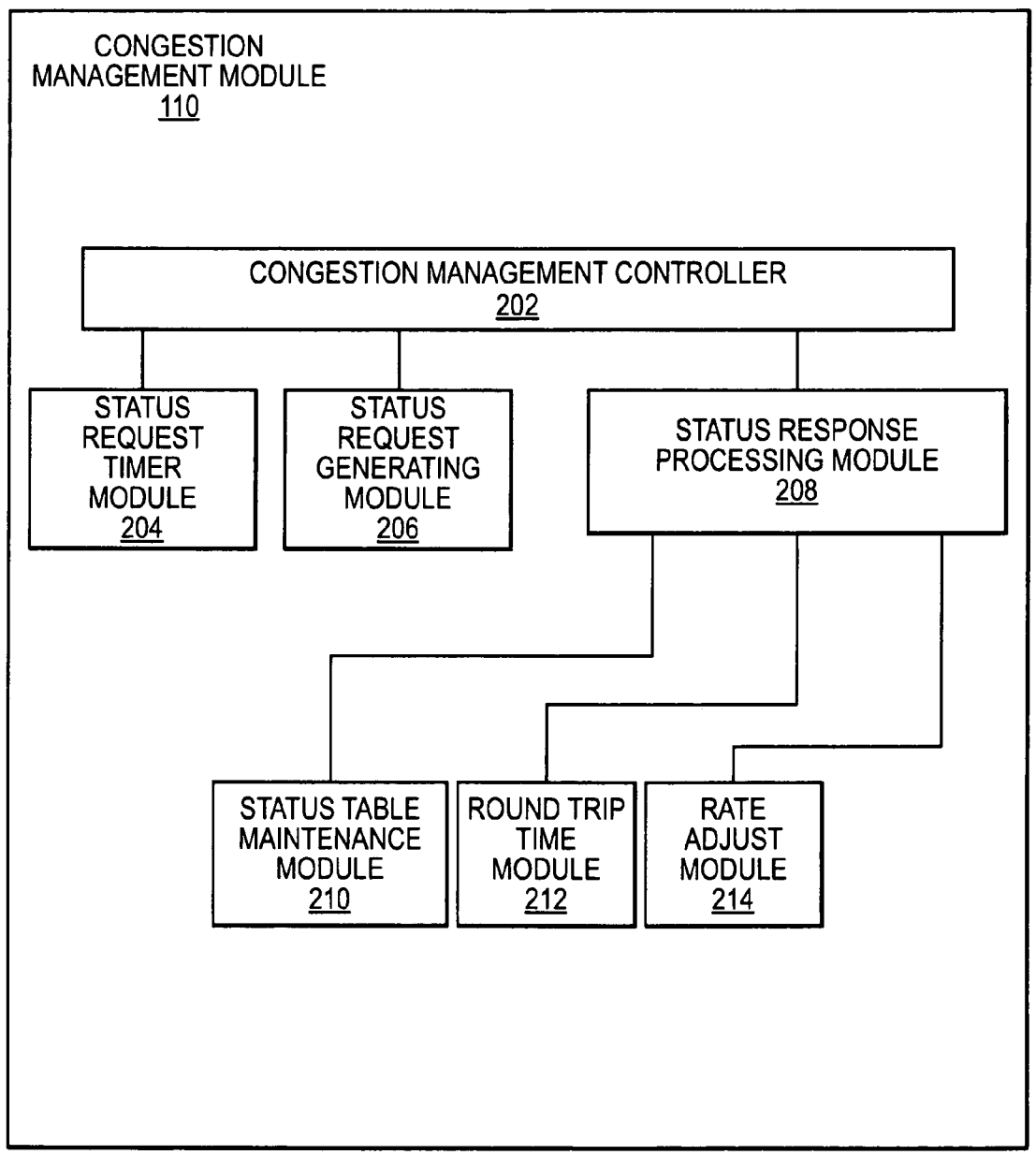
FIG. 2 is a detail block diagram of a congestion management module shown in FIG. 1.

FIG. 2 is a detail block diagram of congestion management module 110 described above with respect to FIG. 1. As shown in FIG. 1, congestion management module 110 may include a congestion management controller 202, a status request timer module 204, a status request generating module 206, a status response processing module 208, a status table maintenance module 210, a round trip time module 212, and a rate adjust module 214.

In operation, congestion management controller 202 maintains a set of static and/or dynamically updated control parameters that is used by congestion management controller 202 to invoke the other modules included in congestion management module 110, as needed, to control congestion in an IP multicast system based on the described process that mitigates the impact of signal blockage. For example, congestion management controller 202 communicates with and receives status updates from the respective modules within congestion management module 110 to allow congestion management controller 202 to generate congestion status request messages, process congestion status response messages and update transmission rates assigned to the respective transmission queues based on information obtained in the respective congestion status response messages, for example, as described below with respect to FIG. 7.

Status request timer module 204 is invoked by congestion management controller 202 to set a periodic congestion status request timer for a transmission queue. In a system in which a separate transmission rate is assigned to each transmission queue, status request timer module 204 sets a status request timer for each of the respective queues, so that a congestion status request message/congestion status response message cycle may be preformed for the queue and the transmission rate for the queue adjusted as necessary, as described in greater detail below.

Status request generating module 206 is instructed by congestion management controller 202 to generate a congestion status request message for a transmission queue on expiration of a status request timer associated with the transmission queue set by status request timer module 204 as instructed by congestion management controller 202, as described above. The generated congestion status request message is transmitted to the receiver devices associated with the queue and includes a header that includes a time that the message was generated, and contains node status data that identifies one or more of the receiver devices as responding devices, i.e., a receiver device that is directed to immediately respond to the congestion status request message with a congestion status response message. For example, one or more of the receiver devices identified as a responding devices may be receiver device that, based on data maintained in the node status table library 116, described above, has a lowest calculated transmission rate and has therefore been identified as the current limiting receiver (CLR) or one of several potential limiting receivers (PLR's).

Status response processing module 208 is invoked by congestion management controller to process a congestion status response messages received from receiver devices in response to an issued congestion status request message. As described in greater detail below and with respect to FIG. 7, status response processing module 208 processes a received congestion status response message to update node status table information maintained in node status tables repository 116, described above with respect to FIG. 1, and to generate and store in node status tables repository 116 a round trip time (RTT) for the responding receiver device for the current congestion status request message/congestion status response message cycle based on adjusted time information included in the received congestion status response message. Once a response period for responding to the outstanding congestion status request message has expired, status response processing module 208 selects a node and uses the determined round trip time for the selected node to determine a new transmission rate for the transmission queue. For example, in one exemplary embodiment, status response processing module 208 selects the node with the longest determined round trip time, i.e., the current limiting receiver (CLR), and uses data related to the congestion monitoring period for the CLR to determine the new transmission rate for the transmission queue. In another exemplary embodiment a round trip time associated with a node other than the determined CLR can be used, such as a node with a longest round trip time within a lowest range or round trip times, i.e., a range that is sufficiently short to exclude round trip times associated receivers that experienced signal blockage during the congestion monitoring period.

Status table maintenance module 210 is invoked by status response processing module 208 to retrieve data from a received congestion status response message and to update fields for the corresponding receiver device in the node status tables repository 116, described above with respect to FIG. 1. For example, status table maintenance module 210 may retrieve a count of congestion marked packets, a count of dropped packet transmissions and an adjusted time value included within a congestion status response message, and may store the respective values, along with a time of receipt time stamp corresponding to the time the congestion status response message was received by multicast broadcast device 100, in node status tables repository 116 in association with the responding receiver device, as described above with respect to FIG. 1.

Round trip time module 212 is invoked by status response processing module 208 to generate an estimated round trip time for a responding receiver device based on information stored in node status tables repository 116 in association with the responding receiver device. For example, round trip time module 212 may generate an estimated round trip time based of the adjusted time value and the time of receipt time stamp, i.e., the time at which the congestion status response message was received by multicast broadcast device 100, which were stored in node status tables repository 116 in association with the receiver device, upon receipt of a congestion status response message from the receiver device, as described above.

For example, as described in greater detail below, the packet header of a congestion status request message transmitted from multicast broadcast device 100 can include a timestamp that represents a time at which the congestion status request message was transmitted by multicast broadcast device 100 to the respective receiver devices. Prior to transmission of a congestion status response message, a responding receiver device may generate and include in a packet header field of the congestion status response message, an adjusted timestamp that includes the timestamp value received in the congestion status request message plus the time required by the responding receiver device to generate the congestion status response message. Therefore, by subtracting the adjusted timestamp from the congestion status response message time of receipt, round trip time module is able to produce an estimate round trip time for the congestion status request message/congestion status response message cycle, i.e., a measure of the transit time for the congestion status request message to travel from multicast broadcast device 100 to the responding receiver device plus a measure of the time for the congestion status response message to travel from the responding receiver device to multicast broadcast device 100. This estimated round trip time may be stored in node status tables repository 116 in association with the responding receiver device.

Rate adjust module 214 may be invoked by status response processing module 208 to generate a new transmission rate for a transmission queue based on congestion data received from one or more receiver devices, as described above, responding to an issued congestion status request message with a congestion status response message. For example, in one exemplary embodiment, rate adjust module 214 may generate a new transmission rate uses a TCP congestion control algorithms used by the existing NORM protocol, e.g., such as the TCP Friendly rate equation as defined in RFC3940 (4) as shown in equation 1, below.

$$\text{New\_Rate} = \frac{s}{R\sqrt{\frac{2p}{3}} + 12\sqrt{\frac{3p}{8}}\, p(1+32p^2)}$$ Eq. #1

Where s is the nominal transmitted packet size, e.g., based on an exponentially weighted moving average of transmitted packet sizes;

R is a packet round trip time (RTT) estimate for the current limiting receiver, and;

p is the loss event fraction, e.g., a fraction between 0 and 1, of the current limiting receiver based on equation 2, below, where $$p = \text{alpha} * NCMP + \text{beta} * NDP \quad (0 < p < 1)$$ Eq. #2

Where alpha is a percentage less than 1, as described below;

NCMP is the count of congestion marked packets;

Beta is a percentage less than 1; as described below, and

NDP is the count of dropped packets.

The described approach for determining a new transmission rate for a transmission queue differs from previous approaches in that the loss event fraction is based on a count of congestion marked packets received by the current limiting receiver during the selected congestion monitoring period, as well as, a count of packet transmissions dropped by the current limiting receiver during the selected congestion monitoring period.

Previous approaches, in which the loss event fraction was based only on the count of congestion marked packets and round trip time, were developed primarily for wire-based multicast systems that did not suffer from intermittent, transmission blockages, as occur in radio-based multicast systems. The blockages experienced by radio based multicast systems cause packets to be dropped and resent, but the resending of a packet does not occur, e.g., as described with respect to the NORM protocol, until a blocked node becomes unblocked and, a NACK is sent. Therefore, the blockages experienced by a radio based multicast system can significantly increased estimate of round trip time which, as shown in equation 1, leads to the generation of a transmission rate that is artificially low.

A transmission path that suffers from a relatively small number of short term blockages rarely result in transmission queue congestion because the blockages are quickly cleared, a NACK is sent, and a relatively few number of packets are retransmitted, which may slightly increase the number of packets in a corresponding transmission queue, but is unlikely to result in significant transmission queue congestion. However, a relatively small number of short term blockages that would not cause significant transmission queue congestion can significantly increase the estimated round trip time associated with a congestion control cycle. Based on the TCP congestion control algorithm shown above in equation #1, an increase in the estimated round trip time will result in the generation of a lower transmission rate. However, throttling back a transmission rate does nothing to clear, or prevent, blockages, so lowering the transmission rate under such conditions unnecessarily decreases system throughput.

However, severe blockages, can result in the resending of large numbers of packets, which can result in transmission queue congestion. Although the impact of severe blockages may be addressed based on the resulting number of congestion marked packets reported in subsequent congestion control cycles, the impact of severe blockages can be anticipated and can be mitigated by reducing the transmission rate in response to a high rate of blockages, thereby reducing the severity of the resulting congestion.

Based on equation #1, described above, it is apparent that the generated rate of transmission increases as the round trip time decreases, and the generated rate of transmission decreases round trip time increases. Further, based on equation #1, described above, it is apparent that the generated rate of transmission increases as the loss event fraction, p, decreases, and the generated rate of transmission decreases as the loss event fraction, p, increases. Therefore, to maintain high rates of transmission in the face of relatively few dropped packets, a value of Beta may be selected such that the impact of the count of dropped packets does not significantly increase the value of the loss event fraction for relatively small numbers of dropped packets, but is allowed to impact, i.e., increase, the value of the loss event fraction for relatively large numbers of dropped packets. Further, assuming that a value of Beta is held sufficiently low that the effects of a relatively small number of dropped packets do not significantly impact the generated transmission rate, e.g., using equation #1, a value of Alpha may be selected such that the generated transmission rate in the face of no congestion is equal to a target transmission rate for the queue, e.g., 1 Mbit/sec, but sufficiently high that the generated transmission rate is lowered in response to the detection of congestion marked packets at the receiver device.

The described approach, adjusts the loss event fraction based on both a count of congestion marked packets and a count of dropped packet transmissions during a congestion monitoring period. In such a manner, the described approach allows the rate of transmission to be adjusted to alleviate congestion that may result from severe blockages, but once that congestion is cleared, does not allow blockages that do not result in congestion from adversely affecting transmission throughput by preventing the TCP congestion control algorithm from reducing the determined transmission rate in response to blockages that do not result in congestion.

It is noted that the described approach is not limited to the example TCP congestion control algorithm described above with respect to equation 1. For example, the described approach may be used with any TCP congestion control algorithm that includes a loss event fraction or similar parameter that, in wire-based networks, provides the TCP congestion control algorithm with a measure of network congestion. By substituting a loss event parameter that is based on both a count of congestion marked packets and a count of dropped packet transmissions during a congestion monitoring period, as described above, any TCP congestion control algorithm can be adapted for use in a wireless environment to avoid unnecessary reduction in broadcast transmission rates in response to blockages that do not result in congestion, yet allow the adapted TCP congestion control algorithm to respond appropriately in the event of severe blockages that result in congestion and/or to respond appropriately to congestion unrelated to transmission blockage.

Figure 3:
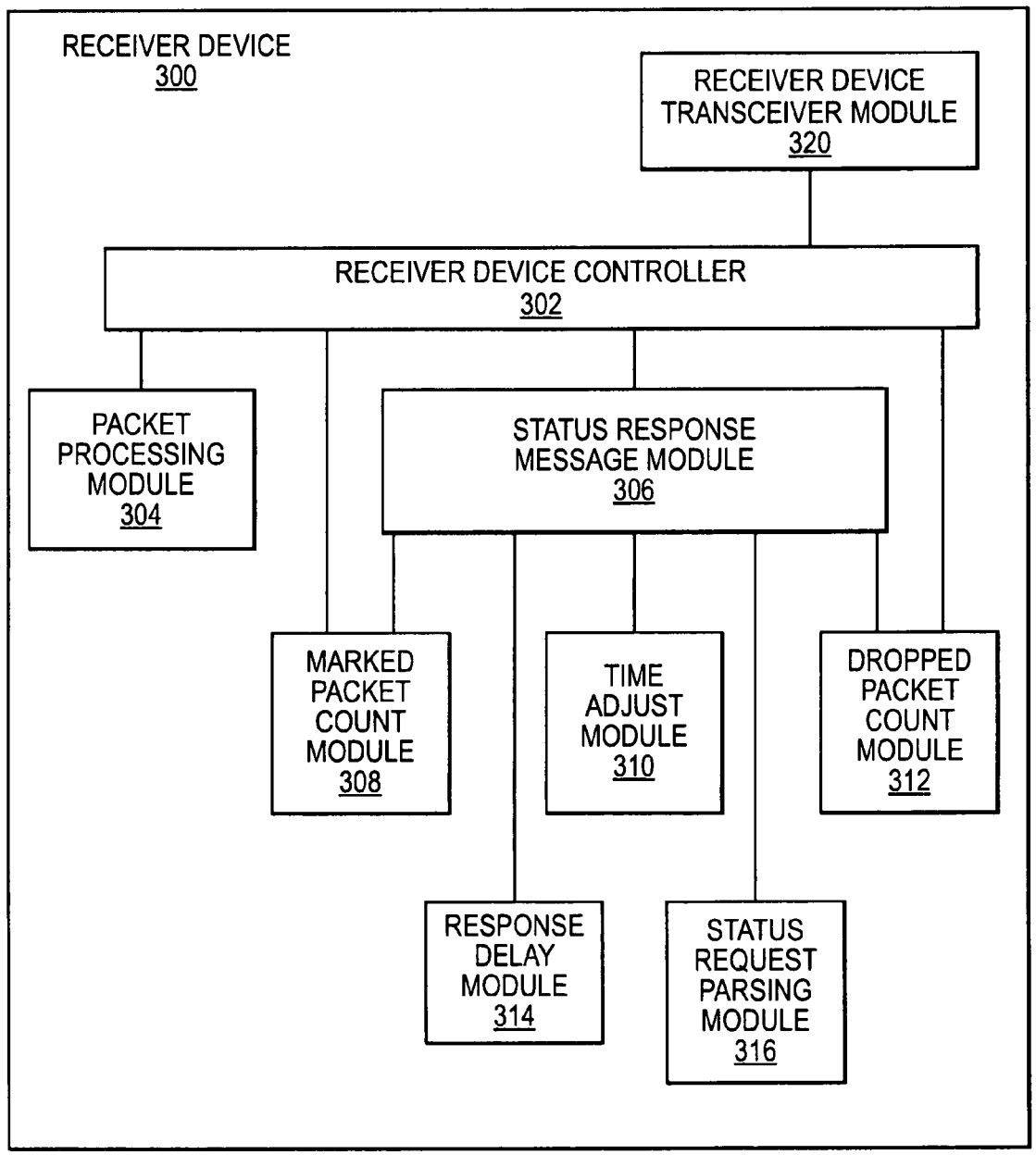
FIG. 3 is a block diagram of an exemplary embodiment of an IP receiver device that includes features that support the receipt of multicast broadcast messages and exemplary embodiments of the described method of congestion control in IP multicast that mitigates the impact of signal blockage.

FIG. 3 is a block diagram of an exemplary embodiment of an IP receiver device that supports the receipt of IP multicast broadcast content messages and exemplary embodiments of the described method of congestion control in IP multicast that mitigates the impact of signal blockage. As shown in FIG. 1, receiver device 300 can include a receiver device controller 302, a packet processing module 304, a status response message module 306, a marked packet count module 308, a time adjust module 310, a dropped packet count module 312, a response delay module 314, a status request parsing module 316, and a receive device transceiver module 320.

In operation, receiver device controller 302 maintains a set of static and/or dynamically updated control parameters that can be used by receiver device controller 302 to invoke other modules included in receiver device 300 to perform operations, as described below, in accordance with the control parameters and a set of predetermined process flows, such as those described below with respect to FIG. 6 and FIG. 8. Receiver device controller 302 may communicate with and receive status updates from the respective modules within receiver device 300 to allow receiver device controller 302 to control operation of the respective process flows.

For example, with respect to broadcast content packets received, e.g., via receiver transceiver module 320, from multicast, or non-multicast, broadcast devices, receiver device controller 302 can control the processing of the respective packets by packet processing module 304, resulting in the packet content being extracted and passed to appropriate voice and data application modules (not shown) also included in receiver device 300. With respect to IP multicast congestion control, receiver device controller 302 invokes a congestion marked packet count module and a dropped packet count module, as well as a status response module, as described in greater detail below to support the described method of congestion control in IP multicast that mitigates the impact of signal blockage.

Packet processing module 304 can be invoked by receiver device controller 302 to process received broadcast content packets and to pass extracted data to an appropriate voice and/or data application module (not shown) which is also included in receiver device 300. For example, a content packet containing voice data may be sent to an application module capable of processing the data to reconstitute the voice data so that it may be used to drive a sound output device or speaker (also not shown). A content packet containing data may be sent to an application module capable of processing the data in an appropriate matter so that it may be used to drive user interfaces, e.g., video display, keypad, etc., with the operator of the receiver device.

Status response message module 306 can be invoked by receiver device controller 302 to process a congestion status request message and to control generation of a congestion status response message that supports the described method of congestion control in IP multicast that mitigates the impact of signal blockage. For example, receiver device controller 302 may invoke status response message module 306 and related modules described below to implement the example process flows described below with respect to FIG. 6 and FIG. 8.

Marked packet count module 308 can be invoked by receiver device controller 302 to maintain a count of received congestion-marked packets, as described below with respect to FIG. 6. Further, marked packet count module 308 can be invoked by status response message module 306 to obtain the count of congestion marked packets received during a congestion monitoring period for use by status response message module 306 in generating a congestion status response message, as described below with respect to FIG. 8.

Time adjust module 310 can be invoked by status response message module 306 to adjust a time stamp received in a congestion status request message to create an adjusted time stamp as described above. For example, the packet header of a congestion status request message transmitted from multicast broadcast device 100 can include a timestamp that represents a time at which the congestion status request message was transmitted by multicast broadcast device 100 to the respective receiver devices. Prior to transmission of a congestion status response message, status response message module 306 may invoke time adjust module 310 to create an adjusted timestamp that includes the timestamp value received in the congestion status request message plus the time required by the responding receiver device to generate the congestion status response message. The adjusted timestamp is returned in the congestion status response message and used by round trip time module 212, as described above, to estimate a round trip time for the congestion status request message/congestion status response message cycle.

Dropped packet count module 312 can be invoked by receiver device controller 302 to maintain a count of dropped packet transmissions, as described below with respect to FIG. 6. Further, dropped packet count module 312 can be invoked by status response message module 306 to obtain the count of dropped packets received during a congestion monitoring period for use by status response message module 306 in generating a congestion status response message, as described above, and below with respect to FIG. 8.

Response delay module 314 can be invoked by status response message module 306 to initiate a delay timer that causes the receiver device to delay responding to a received congestion status request message. For example, in one exemplary embodiment, such a delay may be invoked if the congestion status request message does not identify the receiver device as the current limiting receiver (CLR) or one of several potential limiting receivers (PLR's). Therefore, rather than responding immediately, the receiver device sets a random delay timer and may generate a congestion status response message if the timer expires before the response period expires, or before the response is cancelled, as described below with respect to FIG. 8.

Status request parsing module 316 can be invoked by status response message module 306 to extract information contained from a newly received congestion status request message. For example, status request parsing module 316 may parse a header of the congestion status request message to retrieve a header, to retrieve the identity of the current limiting receiver (CLR), the one or more potential limiting receivers (PLR's), and the transmission time stamp. Status request parsing module 316 may provide extracted data to status response message module 306 which may use the extracted data to control how the receiver device 300 responds to the received congestion status request message.

Figure 4:
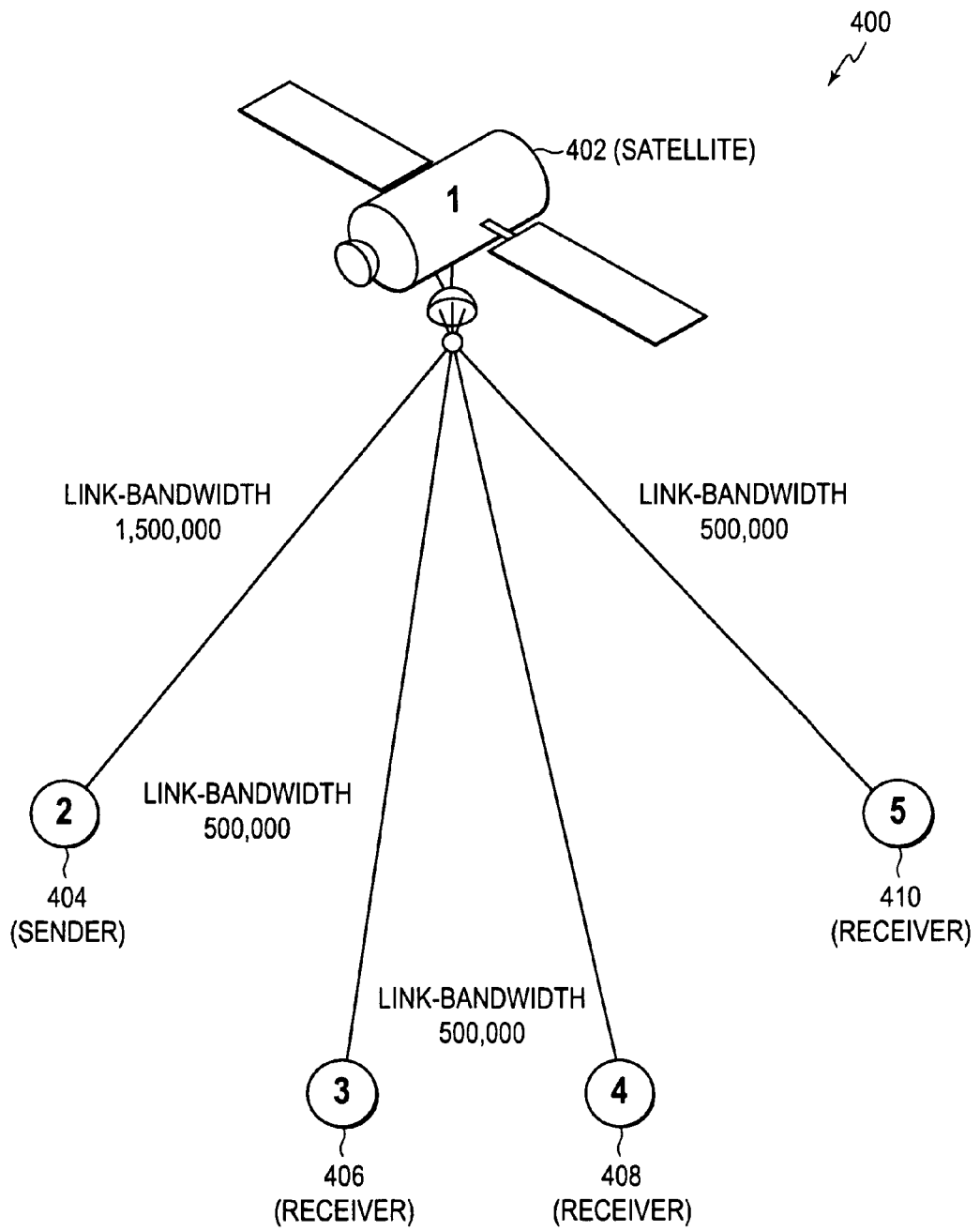
FIG. 4 is a schematic diagram of an IP multicast system that includes an exemplary embodiment of the IP multicast broadcast device of FIG. 1, and exemplary embodiments of the IP receiver device of FIG. 3, and that supports exemplary embodiments of the described method of congestion control in IP multicast that mitigates the impact of signal blockage.

FIG. 4 is a schematic diagram of an IP multicast system that includes an exemplary embodiment of the IP multicast broadcast device of FIG. 1 and FIG. 2, and exemplary embodiments of the IP multicast receiver device of FIG. 3 that supports exemplary embodiments of the described method of congestion control in IP multicast that mitigates the impact of signal blockage. As shown in FIG. 4, IP multicast system may include a multicast broadcast device 402, a broadcast content sending device 404, and multiple receiver devices, i.e., receiver device 406, receiver device 408 and receiver device 410. In operation, broadcast content sending device 404 may transmit content packets to multicast broadcast device 402 which may receive and store the packets in transmission queues, e.g., as described above with respect to FIG. 1, until the respective packets can be transmitted to receivers within a multicast group using reliable IP multicast broadcast techniques.

Figure 9:
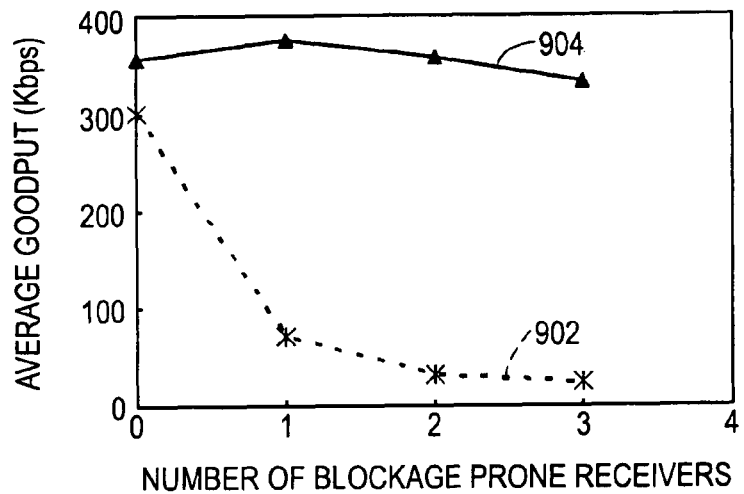
FIG. 9 presents plots of simulated average throughput that may be achieved between a multicast broadcast device and up to 3 blockage prone receivers using different methods of IP multicast congestion control.
Figure 10:
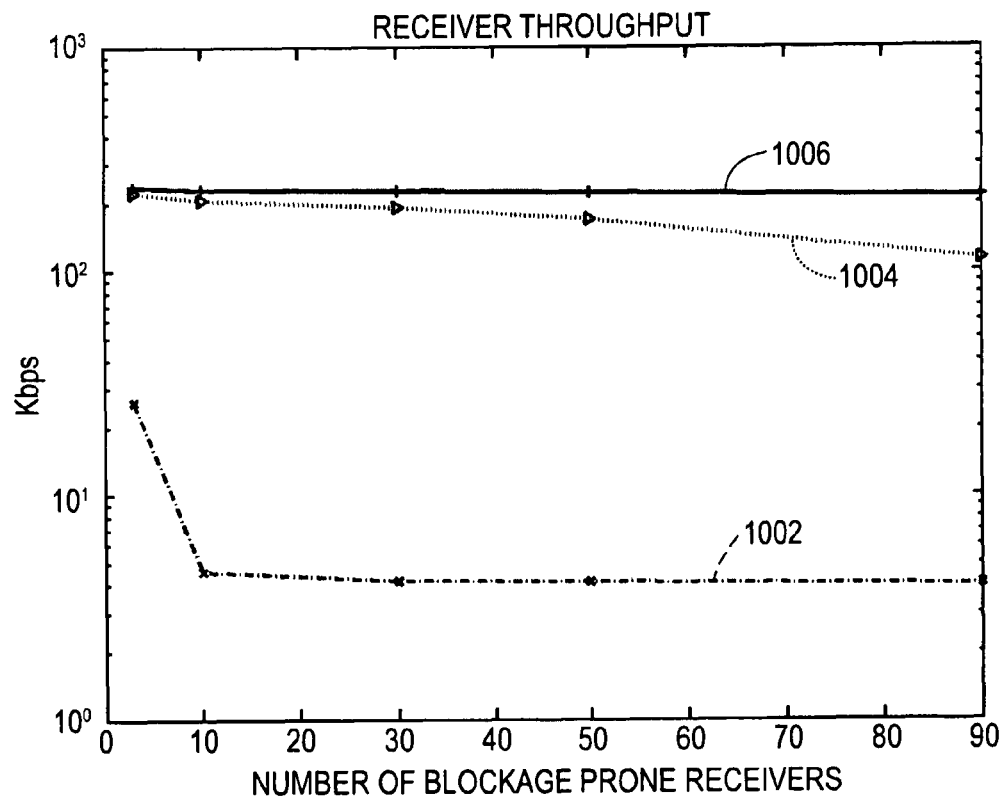
FIG. 10 presents plots of simulated average throughput that may be achieved between a multicast broadcast device and up to 90 blockage prone receivers using different methods of IP multicast congestion control.

As further shown in FIG. 4, broadcast content sending device 404 and multicast broadcast device 402 can be configured to transfer broadcast content packets from sending device 404 to multicast broadcast device 402 at a first transmission rate, e.g., a rate of 1.5 MB/second, while multicast broadcast device 402 and receiver devices may be configured to transfer broadcast content packets from multicast broadcast device 402 to the respective receiver devices at a second transmission rate, e.g., 500 KB/second. The first transmission rate, i.e., the transmission rate between sending device 404 and multicast broadcast device 402, may be faster than the second transmission rate, i.e., the transmission rate between multicast broadcast device 402 to the respective receiver devices, so long as the stream of broadcast content packets is sufficiently intermittent that the queue buffers in multicast broadcast device 402 do not over flow. However, further delays, e.g., due to dropped packets, NACK requests and packet retransmission, between multicast broadcast device 402 and the respective receiver devices, may result in congestion in the one or more transmission queues of multicast broadcast device 402. FIG. 9 and FIG. 10, described below, provide simulated transmission rates between a multicast broadcast device and receiver devices that support a physical network configuration as described above with respect to FIG. 4.

Figure 5:
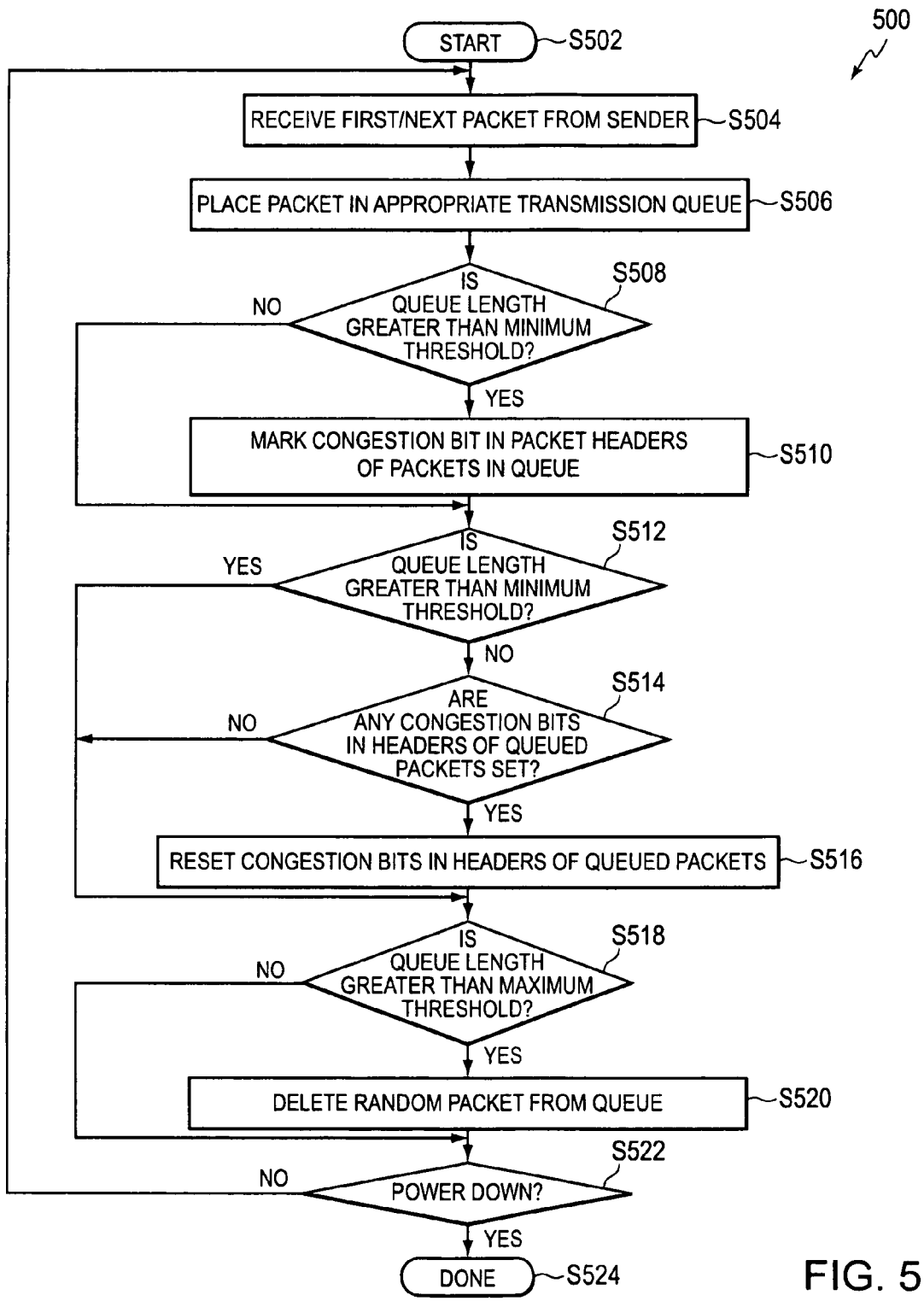
FIG. 5 is a flow-chart of an example process that may be used by an example multicast broadcast device embodiment to mark packets within a transmission queue that has been affected by congestion.

FIG. 5 is a flow-chart of an example process flow that may be used by an exemplary embodiment of multicast broadcast device 100 that supports the described method of congestion control in IP multicast that mitigates the impact of signal blockage, while operating in a multicast network configuration similar to the multicast network configuration described above with respect to FIG. 4. As shown in FIG. 5, operation of process 500 begins at S502 and proceeds to S504.

At S504, multicast broadcast device 100 receives a first/next packet from a sending device, e.g., sending device 404 as described in FIG. 4, above, and operation of the process continues at S506.

At S506, multicast broadcast device 100 invokes queue managing module 106 to store the received packet in a transmission queue based, for example, on the multicast group with which the packet is associated, and operation of the process continues at S508.

At S508, if queue monitoring module 108 determines that a running weighted average of the queue length exceeds a minimum threshold, e.g., $min_{th}$, as described above, operation of the process continues at S510; otherwise, operation of the process continues at S512.

At S510, queue monitoring module 108 marks the packet headers of each packet in the queue to indicate congestion, e.g., the ECN congestion bit are set to indicate congestion, and operation of the process continues at S512.

At S512, if queue monitoring module 108 determines that a running weighted average of the queue length does not exceed a minimum threshold, e.g., $min_{th}$, as described above, operation of the process continues at S514; otherwise, operation of the process continues at S518.

At S514, if queue monitoring module 108 determines that congestion bits in the headers of packets in the queue have been set to indicate congestion, operation of the process continues at S516; otherwise, operation of the process continues at S518.

At S516, queue monitoring module 108 resets the packet headers of each packet in the queue to remove the indication of congestion, e.g., the ECN congestion bit may be reset to indicate no congestion, and operation of the process continues at S518.

At S518, if queue monitoring module 108 determines that a running weighted average of the queue length exceeds a maximum threshold, e.g., $max_{th}$, as described above, operation of the process continues at S520; otherwise, operation of the process continues at S522.

At S520, queue monitoring module 108 instructs queue managing module 106 to randomly delete one or more packets from the transmission queue, and operation of the process continues at S522.

At S522, if broadcast device controller 102 determines that a power-down instruction has been received, operation of the process terminates at S524; otherwise, operation of the process continues at S504.

Figure 6:
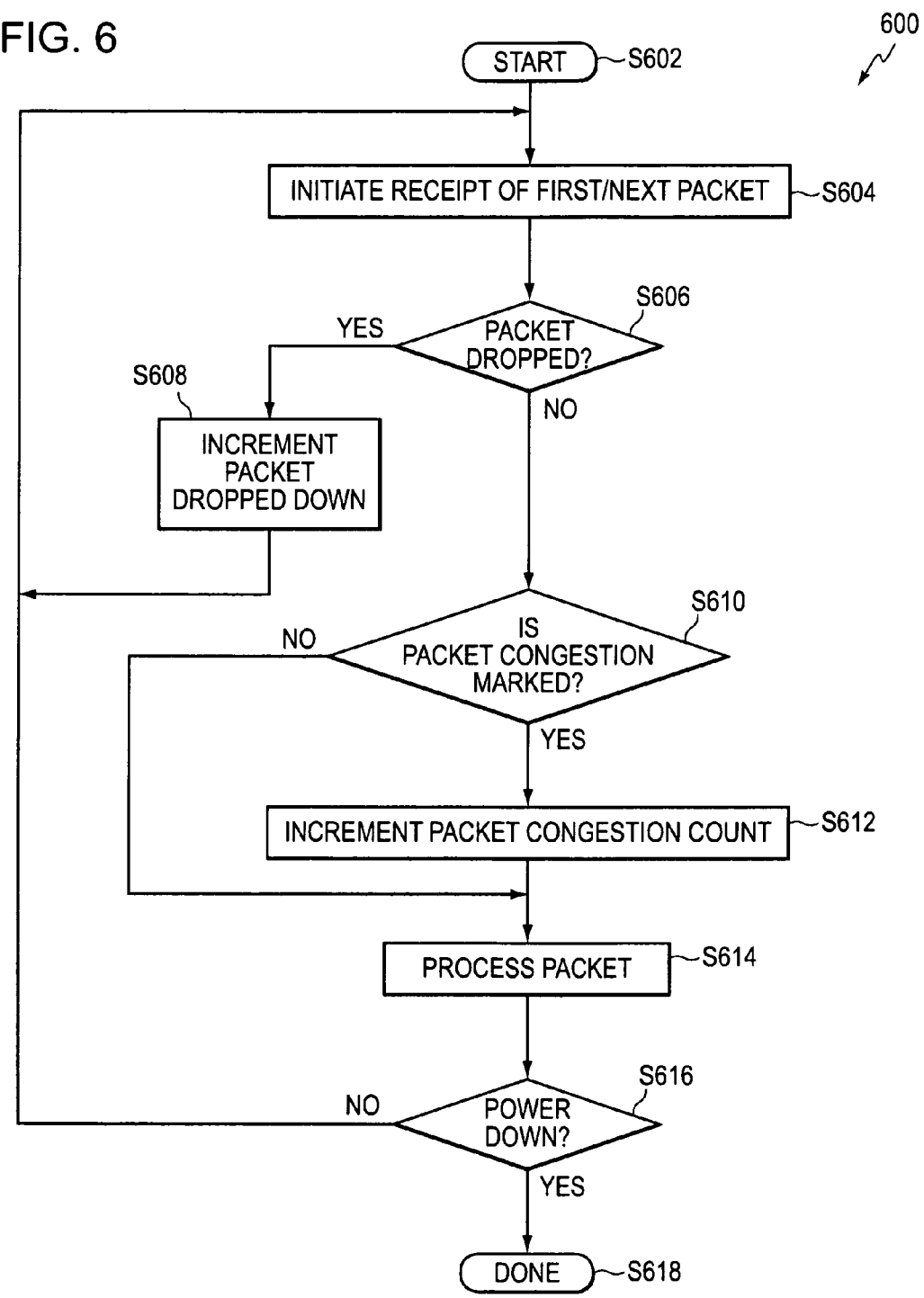
FIG. 6 is a flow-chart of an example process that may be used by an example IP receiver device embodiment to count congestion-marked packets and to count dropped packets while receiving packets from an example IP multicast broadcast device embodiment.

FIG. 6 is a flow-chart of an example scalefactor estimation process that may be implemented by receiver device 300, described above with respect to FIG. 3, to generate congestion marked packets and dropped packet transmission counts in support of the described method of congestion control in IP multicast that mitigates the impact of signal blockage. As shown in FIG. 6, operation of process 600 begins at S602 and proceeds to S604.

At S604, receiver device transceiver module 320, under the control of receiver device controller 302 initiates the receipt of a first/next packet from multicast broadcast device 100, and operation of the process continues at S606.

At S606, if receiver device transceiver module 320 indicates to receiver device controller 302 that a packet transmission has been dropped, operation of the process continues at S608; otherwise, operation of the process continues at S610.

At S608, receiver device controller 302 invokes dropped packet count module 312 to increment an existing dropped packet count for the current congestion control monitoring period, and operation of the process continues at S604.

At S610, if receiver device controller 302 determines that the received packet is congestion marked, operation of the process continues at S612; otherwise, operation of the process continues at S614.

At S612, receiver device controller 302 invokes marked packet count module 308 to increment an existing marked packet count for the current congestion control monitoring period, and operation of the process continues at S614.

At S614, receiver device controller 302 may invoke packet processing module 304 to process the received content packet and to deliver data contained within the received packet to the voice or data application operating on receiver device 300 for which the packet is intended, and operation of the process continues at S616.

At S616, if receiver device controller 302 determines that a power-down instruction has been received, operation of the process terminates at S618; otherwise, operation of the process continues at S604.

Figure 7:
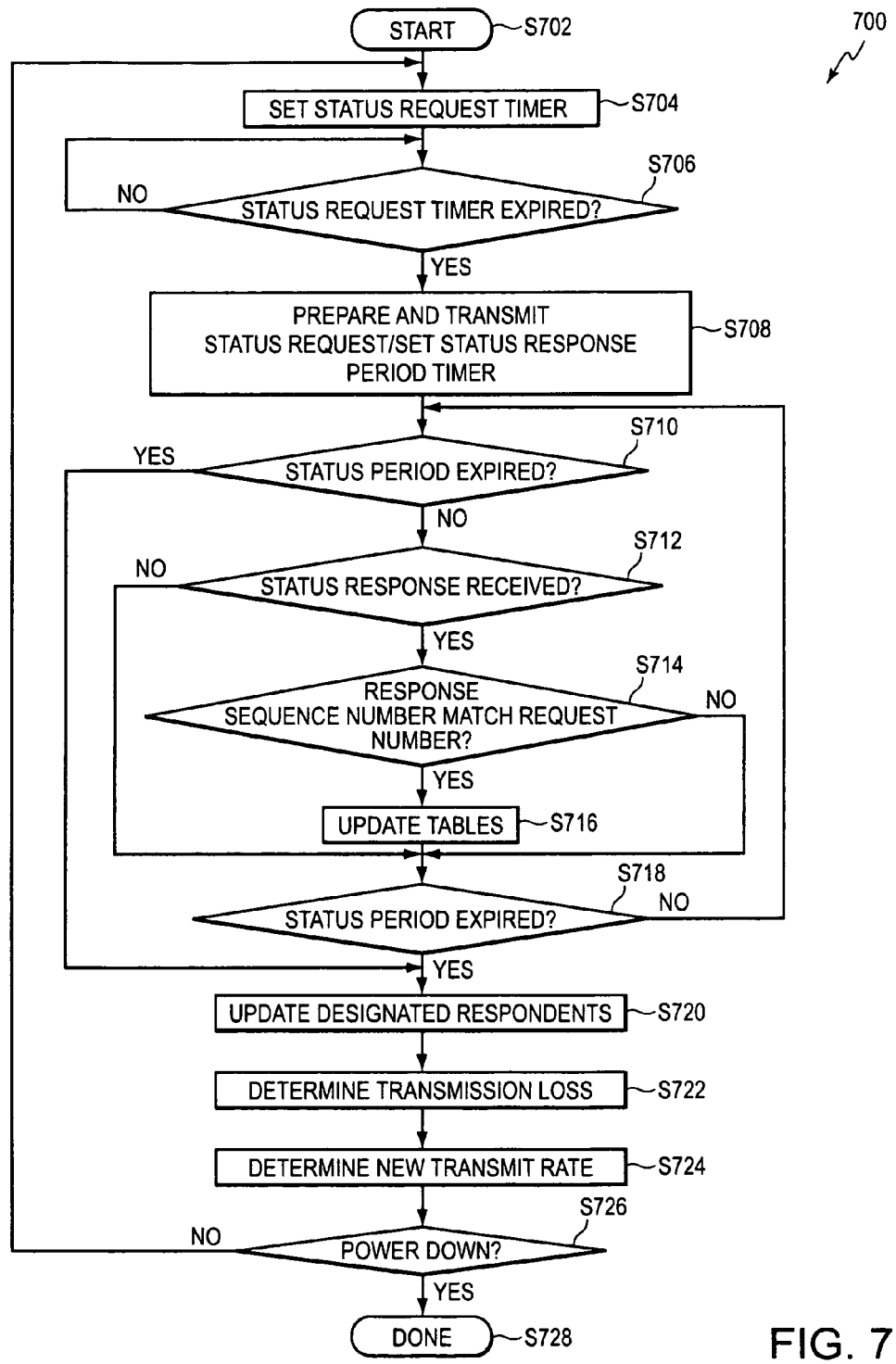
FIG. 7 is a flow-chart of an example process that may be used by an example multicast broadcast device embodiment to control the generation and transmission of status request messages and to process incoming status response messages.

FIG. 7 is a flow-chart of an example process that may be used by an example multicast broadcast device 100 embodiment to control the generation and transmission of status request messages and to process incoming status response messages, as described above with respect to FIG. 1 and FIG. 2. As shown in FIG. 7, operation of process 700 begins at S702 and proceeds to S704.

At S704, status request timer module 204 is invoked by congestion management controller 202 to set a congestion status request timer for a transmission queue, as described above with respect to FIG. 2, and operation of the process continues at S706.

At S706, if the congestion status request timer expires, operation of the process continues at S708; otherwise, operation of the process continues at S706.

At S708, status request generating module 206 is invoked by congestion management controller 202 to generate a congestion status request message that is transmitted by broadcast device controller 102 via broadcast device transceiver module 120 to one or more receiver devices 300, and status request timer module 204 is invoked by congestion management controller 202 to set a congestion status response period timer, and operation of the process continues at S710.

At S710, if congestion management controller 202 determines that the congestion status response period timer has expired, operation of the process continues at S720; otherwise, operation of the process continues at S712.

At S712, if congestion management controller 202 determines that a congestion status response message has been received, operation of the process continues at S714; otherwise, operation of the process continues at S718.

At S714, if congestion management controller 202 determines that a sequence number of the received congestion status response message matches a sequence number included in the header of the congestion status request message associated with the pending congestion status response period timer, operation of the process continues at S716; otherwise, operation of the process continues at S718.

At S716, status response processing module 208 instructs status table maintenance module 210 to retrieve data from a received congestion status response message and store the data in corresponding fields for the responding receiver device in the node status tables repository 116. Further, status response processing module 208 may instruct round trip time module to estimate a new estimated round trip time for the responding receiver based on the received adjusted time stamp received in the congestion status response message and the recorded time of receipt of the congestion status response message by broadcast device transceiver module 120, as described above with respect to FIG. 1 and FIG. 2, and operation of the process continues at S718.

At S718, if congestion management controller 202 determines that the congestion status response period has expired, as described above with respect to FIG. 2, operation of the process continues at S720; otherwise, operation of the process continues at S710.

At S720, status response processing module 208 assesses the new estimated round trip times stored in node status tables repository 116 with respect to receiver devices that responded during the last congestion status response period and selects a new current limiting receiver (CLR) and one or more probable limiting receivers (PLR) and updates the tables in node status tables repository 116 corresponding to the respective receiver devices to reflect their respective new determined status, and operation of the process continues at S722.

At S722, status response processing module 208 determines a transmission loss, or loss event fraction, for the current limiting receiver device. If a count of congested packets and a count of dropped packets was received in the congestion status response message received from the current limiting receiver and stored in node status tables repository 116 in association with the current limiting receiver, rate adjust module is instructed by status response processing module 208 to retrieve the data and to generate a loss event fraction for the current limiting receiver, as described above with respect to equation 2. However, as described below with respect to FIG. 8, in some embodiments, each responding receiver may generate a loss event fraction, e.g., based on equation #2 and the count of congested packets and the count of dropped packets detected by the receiver, and provide the loss event fraction in the congestion status response message received from the responding receiver. In either approach, once status response processing module 208 has obtained a measure of transmission loss, e.g., such as a loss event fraction, that can be used to generate a new transmission rate for the current limiting receiver, operation of the process continues at S724.

At S724, status response processing module 208 may instruct rate adjust module 214 to determine a new transmission rate that will be used by multicast broadcast device 100 in future transmissions to receiver devices subscribed to the current multicast queue, and operation of the process continues at S726.

At S726, if broadcast device controller 102 determines that a power-down instruction has been received, operation of the process terminates at S728; otherwise, operation of the process continues at S704.

Figure 8:
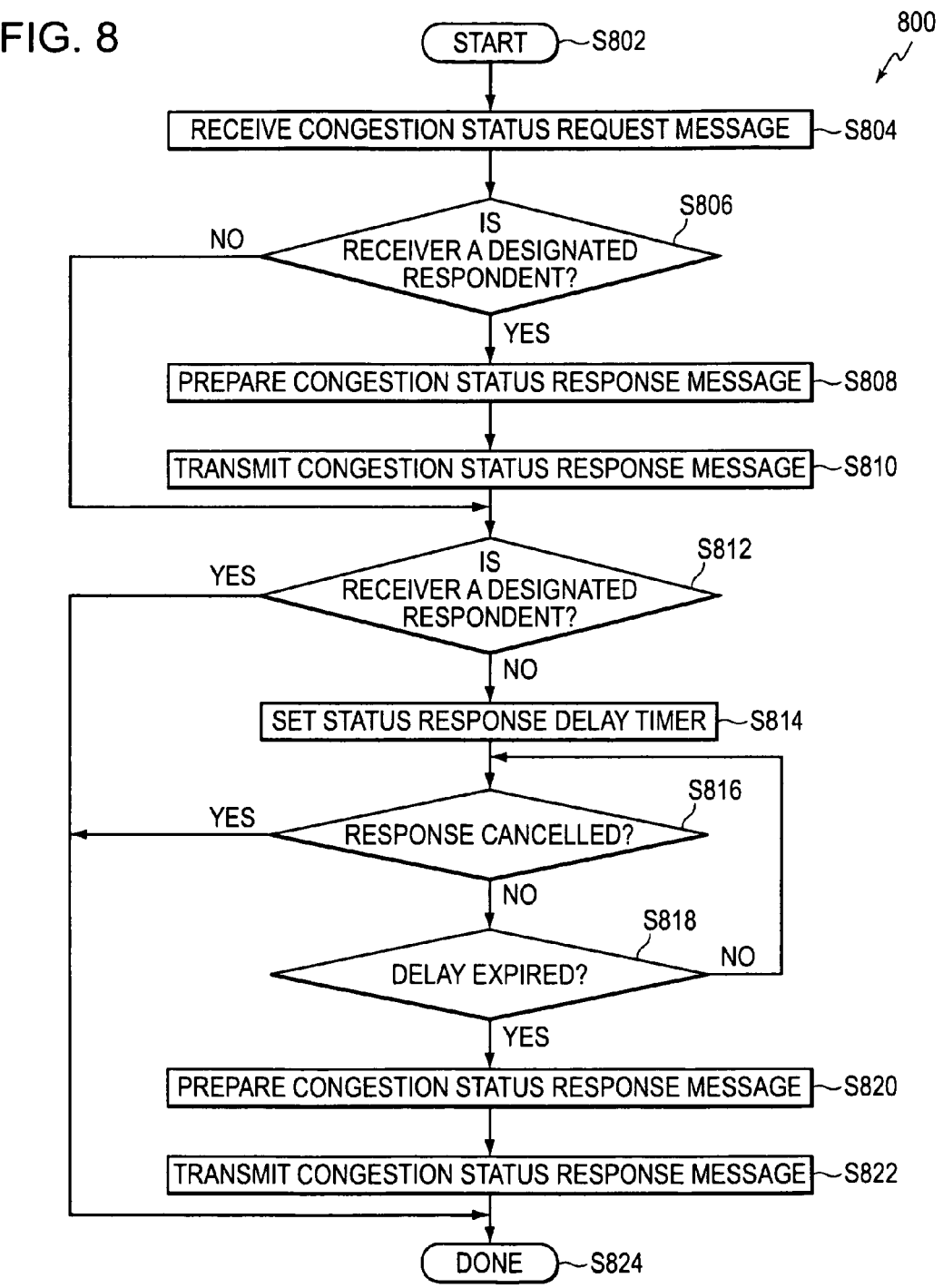
FIG. 8 is a flow-chart of an example process that may be used by an example receiver device embodiment to control the generation and transmission of a status response message in response to a received status request messages.

FIG. 8 is a flow-chart of an example process that may be used by an example multicast receiver device embodiment to control the generation and transmission of a congestion status response message in response to a received congestion status request messages, as described above with respect to FIG. 3. As shown in FIG. 8, operation of process 800 begins at S802 and proceeds to S804.

At S804, receiver device controller 302 receives, e.g., via receiver device transceiver module 320, a congestion status request message, and operation of the process continues at S806.

At S806, if receiver device controller 302 determines, e.g., based on the CLR and PLR information contained in the header of the congestion status request message, that the receiver is a designated respondent, operation of the process continues at S806.

At S808, receiver device controller 302 may invoke status response generating module 306 to prepare a congestion status response message, e.g., as described above with respect to FIG. 3. For example, status response generating module 306 may invoke marked packet count module 308, time adjust module 310, and dropped packet count module 312 to obtain the information necessary to build a compliant congestion status response message. For example, in one exemplary embodiment the congestion status response message may include an adjusted timestamp, a congestion marked packet count and a dropped packet count. In another embodiment, the congestion status response message may include an adjusted timestamp, and a transmission loss, e.g., a loss event fraction, based on the congestion marked packet count and a dropped packet count and equation #2, described above. Once the congestion status response message has been prepared, operation of the process continues at S810.

At S810, receiver device controller 302 may invoke receiver device transceiver module 312 to transmit the generated congestion status response message, and operation of the process continues at S812.

At S812, if receiver device controller 302 determines, e.g., based on the CLR and PLR information contained in the header of the congestion status request message, that the receiver is not a designated respondent, operation of the process continues at S814.

At S814, status response message module 306 invokes response delay module 314 to set a random status response delay timer, and operation of the process continues at S816.

At S816, if status response message module 306 determines that the response has been cancelled, e.g., by receipt of a new congestion status request message, operation of the process continues at S824 and the process terminates; otherwise, operation of the process continues at S818.

At S818, if status response message module 306 determines that the status response delay timer has expired, operation of the process continues at S820; otherwise, operation of the process continues at S816.

At S820, receiver device controller 302 invokes status request generating module 306 to prepare a congestion status response message, e.g., as described above with respect to FIG. 3, and above at S808, and operation of the process continues at S822.

At S822, receiver device controller 302 may invoke receiver device transceiver module 312 to transmit the generated congestion status response message, and operation of the process terminates at S824.

FIG. 9 presents plots of simulated average throughput that may be achieved between a multicast broadcast device and up to 3 blockage prone receiver devices using different methods of IP multicast congestion control. FIG. 10 presents plots of simulated average throughput that may be achieved between a multicast broadcast device and up to 90 blockage prone receivers using different methods of IP multicast congestion control. The simulation throughput estimates plotted in FIG. 9 and FIG. 10 were generated based on a physical network configuration similar to the network configuration described above with respect to FIG. 4.

Plot 902 in FIG. 9, and plot 1002 in FIG. 10, represent the throughput achieved in a network in which the multicast broadcast device and the receiver devices do not support the described method of congestion control in IP multicast that mitigates the impact of signal blockage. Such an example multicast network may be an IGMP multicast protocol based network in which the NORM protocol is implemented, but only conventional NORM based congestion management techniques are used, such NACK as the TCP congestion control algorithms that are not based, at least in part, on a count of congestion marked packets and a count of dropped packets, as described above, and as described above with respect to equation #1 and equation #2. As a result of signal blockage and dropped packet transmissions, the round trip time calculated for use in the TCP congestion control algorithm, described above with respect to equation #1, is excessively long, resulting in a transmission rate that is excessively low. As shown by plot 902 and 1002, an IP multicast network that tries to implement IP multicast protocols and TCP congestion control algorithms designed for wire-based network in a radio-based IP multicast network, causes the transmission rate of the network to be dramatically and unnecessarily reduced. This unnecessary reduction in the transmission rate can itself cause congestion within the network.

Plot 904 in FIG. 9, and plot 1004 in FIG. 10, represent the throughput achieved in a network in which the multicast broadcast device and the receiver devices do support the described method of congestion control in IP multicast that mitigates the impact of signal blockage. Such an example multicast network may be an IGMP multicast protocol based network in which the NORM protocol is implemented, as well as a congested packet marking protocol, e.g., such as the ECN protocol described above, as well as router congestion prediction protocol, e.g., such as the RED protocol described above. In addition, the example multicast network may implement a TCP congestion control algorithm that is based, at least in part, on a count of congestion marked packets and a count of dropped packets, as described above, and as described above with respect to equation #1 and equation #2. As a result, the transmission rates calculated by TCP congestion control algorithm are not unduly affected by the increases in the estimated round trip times and, therefore, do not result in transmission rates that are excessively low. As shown by plot 904 and 1004, an IP multicast network that implements the described IP multicast protocols and TCP congestion control algorithms approach is able to mitigate the impact of signal blockage on the network transmission rate. This increase in transmission rate does not compromise the reliability of the IP multicast network. In fact, by avoiding low transmission rates that could result in heavy congestion in the multicast broadcast device transmission queues, the approach can prevent packets from being dropped from the transmission queues, and hence, increase the quality and reliability of the service provided.

Plot 1006 represents simulated throughput, in kilobits per second (Kbps), for a multicast broadcast transmission stream in which all congestion control has been disabled. Such an example multicast network may be an IGMP multicast protocol based network in which the NORM protocol is not implemented and in which no congested packet marking or router congestion prediction is used. Such a system continues to transmit at a fixed rate regardless of the congestion or packet loss experienced in the network. As shown in FIG. 10, the throughput transmission rate maintained by the multicast IP network that supports the described method of congestion control in IP multicast that mitigates the impact of signal blockage, as shown at 1004, rivals the throughput transmission rate maintained by the multicast IP network in which all congestion control has been disabled. However, congestion control cannot be removed from use in an IP multicast network that support more than one type of traffic because doing so would not provide the respective broadcast channels using the network with fair and adequate access to the physical IP multicast network. For this reason, use of a congestion control scheme by an IP multicast system is REQUIRED by the IETF for operation within the general Internet.

It is noted that the modules described above with respect to exemplary embodiments of IP multicast broadcast device 100 and the modules described above with respect to exemplary embodiments of receiver device 300 are exemplary only. Actual embodiments may combine the functions performed by several modules, as describe above, into a single module. Alternatively, a single module, as described above, may be divided into multiple modules. These modules may be implemented using any combination of hardware, software and/or firmware components.

It is noted that the described approach and exemplary embodiments of an IP multicast broadcast device, IP multicast receiver device, and method of congestion control in IP multicast that mitigate the impact of signal blockage in radio-based IP multicast networks, may be used in any radio transmission system that supports reliable multicast over Internet Protocol (IP) networks. Such radio transmission systems may include, but are not limited to satellite based multicast networks in which the multicast signals are transmitted from a satellite, ground based multicast networks in which the multicast signals are transmitted from a land-based transmission tower, air-based multicast networks in which the multicast signals are transmitted from an airship, e.g., an airplane, dirigible, etc., maritime multicast networks in which the multicast signals are transmitted from a ship, barge, buoy, or other floating transmission station, home/office based multicast networks in which the multicast signals are transmitted from a home/office multicast transmitter that broadcasts to electronic devices and/or home/office appliances within the home/office environment, as well as micro-scale transmission multicast networks in which the multicast signals are transmitted from miniature micro-transmitters and/or nano-scale transmission multicast networks in which the multicast signals are transmitted from nano-scale transmitters.

For purposes of explanation in the above description, numerous specific details are set forth in order to provide a thorough understanding of the exemplary embodiments of an IP multicast broadcast device, IP multicast receiver device, and method of congestion control in IP multicast that mitigate the impact of signal blockage in radio-based IP multicast networks. It will be apparent, however, to one skilled in the art based on the disclosure and teachings provided herein that the described embodiments may be practiced without these specific details. In other instances, well-known structures and devices are shown in block diagram form in order to avoid obscuring the features of the described embodiments.

While exemplary embodiments of an IP multicast broadcast device, IP multicast receiver device, and method of congestion control in IP multicast that mitigate the impact of signal blockage in radio-based IP multicast networks have been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:

1. A multicast broadcast device, comprising:
a radio transceiver that broadcasts packets to a plurality of receiver devices;
a transmission queue that stores the packets, in preparation for transmission by the radio transceiver;
a queue monitoring module that monitors the transmission queue and marks the packets in the queue to indicate a state of congestion on determining that one or more queue characteristics exceed a first predetermined queue parameter; and
a status response processing module that processes a status response message from one of the plurality of receiver devices to retrieve one or more parameters used to determine a transmission rate for the packets in the transmission queue,
wherein the transmission rate is determined in part on a count of marked packets received by the one of the plurality of receiver devices and a count of packet transmissions dropped by the one of the plurality of receiver devices.

2. The multicast broadcast device of claim 1, wherein the status response message contains the count of marked packets received and the count of packet transmissions dropped.

3. The multicast broadcast device of claim 1, wherein the status response message contains a loss event fraction based on the count of marked packets received and the count of packet transmissions dropped.

4. The multicast broadcast device of claim 1, wherein the first predetermined queue parameter is an exponentially weighted moving average queue length.

5. The multicast broadcast device of claim 1, wherein the queue manager deletes packets from the transmission queue on determining that queue characteristics exceed a second predetermined queue parameter.

6. The multicast broadcast device of claim 5, wherein the second predetermined queue parameter is an exponentially weighted moving average queue length.

7. The multicast broadcast device of claim 1, further comprising:
a status request generating module that generates a status request message that is sent via the radio transceiver to the plurality of receiver devices,
wherein the status response message is received from the one of the plurality of receiver devices in response to the status message request.

8. The multicast broadcast device of claim 1, further comprising a round trip time module that estimates a round trip time based on message time data included in the status response message.

9. The multicast broadcast device of claim 1, wherein the transmission rate is based on the equation $$\text{New\_Rate} = \frac{s}{R\sqrt{\frac{2p}{3}} + 12\sqrt{\frac{3p}{8}}\, p(1+32p^2)}$$

wherein s is a nominal transmitted packet size based on an exponentially weighted moving average of transmitted packet sizes,
wherein R is a packet round trip time estimate for the receiver device, and
wherein p is a loss event fraction estimated for the receiver device.

10. The multicast broadcast device of claim 9, wherein the loss event fraction is based on an equation $$\text{loss\_event\_fraction} = \text{alpha}*NCMP + \text{beta}*NDP,$$

wherein alpha is a predetermined value less that 1;
wherein NCMP is the count of marked packets received by the receiver device;
wherein beta is a predetermined value less than 1; and
wherein NDP is the count of packet transmissions dropped by the receiving device.

11. The method of claim 1, wherein the transmission rate is based on the equation $$\text{New\_Rate} = \frac{s}{R\sqrt{\frac{2p}{3}} + 12\sqrt{\frac{3p}{8}}\, p(1+32p^2)}$$

wherein s is a nominal transmitted packet size based on an exponentially weighted moving average of transmitted packet sizes,
wherein R is a packet round trip time estimate for the receiver device, and
wherein p is a loss event fraction estimated for the receiver device.

12. The method of claim 11, wherein the loss event fraction is based on an equation $$\text{loss\_event\_fraction} = \text{alpha}*NCMP + \text{beta}*NDP,$$

wherein alpha is a predetermined value less that 1;
wherein NCMP is a count of congestion marked packets received by the receiver device;
wherein beta is a predetermined value less than 1; and
wherein NDP is a count of a number of packet transmissions dropped by the receiving device.

13. A multicast receiver device, comprising:
a radio transceiver that receives packets from a multicast broadcast device;
a marked packet count module that generates a count of marked packets received by the receiver device that are marked to indicate congestion;
a dropped packet count module that generates a count of packet transmissions dropped by the receiver device; and
a status response message module that generates and sends to the multicast broadcast device a status response message containing a loss event parameter based on at least one of the count of marked packets and the count of dropped packets.

14. The multicast receiver device of claim 13, wherein the loss event parameter is a fraction based on the count of marked packets and the count of dropped packets.

15. The multicast receiver device of claim 13, wherein the loss event parameter is the count of marked packets and the count of dropped packets.

16. The multicast receiver device of claim 13, wherein the packets received from the multicast broadcast device include a status request message that includes a time the status request message was transmitted from the multicast broadcast device.

17. The multicast receiver device of claim 16, further comprising:
   a time adjust module that adjusts the time of transmission received in the status request message to exclude an amount of time required for the multicast receiver device to generate for transmission the status response message in reply to the status request message,
   wherein the status response message module includes the adjusted time of transmission in the status response message.

18. The multicast receiver device of claim 16, further comprising:
   a status response parsing module that parses the received status request message to determine whether the multicast receiver device is identified as an immediate respondent.

19. The multicast receiver device of claim 18, further comprising:
   a response delay module that sets a delay timer for responding to the received status request message with a status response message.

20. A method of performing IP multicast congestion control, comprising:
   storing received packets in a transmission queue prior to transmission to a plurality of receiver devices;
   monitoring the transmission queue to determine whether one or more queue characteristics exceed a first predetermined queue parameter;
   marking the packets in the queue to indicate a state of congestion on determining that the first predetermined queue parameter has been exceeded; and
   processing a status response message from one of the plurality of receiver devices to retrieve one or more parameters used to determine a transmission rate for the packets in the transmission queue,
   wherein the transmission rate is determined in part on a count of marked packets received by the one of the plurality of receiver devices and a count of packet transmissions dropped by the one of the plurality of receiver devices.

* * * * *